United States Patent Office 3,207,756
Patented Sept. 21, 1965

3,207,756
MANUFACTURE OF HERBICIDAL 2 - METHYL-THIO-4,6-BIS-AMINO-s-TRIAZINE DERIVATIVES
Enrico Knusli, Riehen, Switzerland, and Walter Stammbach, Hamburg-Rissen, Germany, assignors to J. R. Geigy A.-G., Basel, Switzerland
No Drawing. Filed Aug. 14, 1963, Ser. No. 301,982
Claims priority, application Switzerland, Aug. 28, 1962, 10,245/62
1 Claim. (Cl. 260—249.8)

The present invention deals with improvements in and relating to the manufacture of herbicidal 2-methylthio-4,6-bis-amino-s-triazine derivatives; the derivatives here involved are substituted by at least one organic radical in at least one amino group attached to the triazine nucleus.

It is known that substances of the type mentioned above can be produced by reacting first a chlorine atom of cyanuric chloride with an alkyl mecaptan, e.g., methylmercaptan, and then reacting the two remaining chlorine atoms with alkylamines.

It is also known that the single chlorine atoms in cyanuric chloride possess differing grades of mobility; whereas the first chlorine atom reacts with an alkylamine under normal conditions even in the cold, the reaction of the second chlorine atom requires a temperature between 20 and 40° C. and the third chlorine atom reacts only at increased temperatures.

The aforesaid known process, however, necessitates in the first step i.e. in the reaction of an alkyl mercaptan with cyanuric chloride, the use of specific, relatively difficulty accessible and expensive acid binding agents such as 2,4,6-trimethy pyridine (sym, collidine) (Rec. 78, 967 (1959)).

It is further known that the reaction of 2-chloro-4,6-bis-amino-s-triazine and of its derivatives alkylated in the amino groups, with alkali hydrosulfide to the corresponding 2-mercapto-4,6-bis-amino-s-triazines, must be carried out at an increased temperature and under pressure. (J. Pr. Ch. (2), 33, 297 (1886); German Patent 1,020,982.) The yields obtained in this process are in many cases unsatisfactory and the necessity of working under increased pressure with the highly corrosive alkali hydrosulfide solutions presents difficulties in the manufacturing technique.

In another known process for the production of 2-methoxy-4,6-bisamino-s-triazines, from 2-chloro-4,6-bis-amino-s-trizaines, the methanol required as a participant in the reaction is used at the same time in excess to serve as solvent and/or diluent. In the production of the corresponding 2-methylthio-4,6-bis-amino-s-triazines, however, the low boiling point of the methyl mercaptan required as reactant (B.P. 5.8° C. at 752 torrs) as well as its repulsive odor render the use of this substance as reaction medium practically impossible.

Therefore, as well as for reasons of solubility of the final products and other procedural and economic advantages such as easy recuperability, the use of lower aliphatic alcohols and in particular of methanol as reaction medium would be most desirable. However, the use of methanol as solvent and/or diluent in the reaction of 2-halogeno-4,6-bisamino-s-triazines with methyl mercaptan and as solvent for the resulting end product, namely the aforesaid 2-methylthio-4,6-bis-amino-s-triazines, has hitherto been found unsuitable and impracticable because, in this case, the reaction yields a mixture of 2-methoxy- and 2-methylthio-4,6-bis-amino-s-triazines, a fact which requires a subsequent complicated separation of the reaction products, and so strongly reduces the yield of the desired methylthio derivative, that the process becomes unsuited for application on an industrial scale.

It has now surprisingly been found that by reacting directly 2-halogeno-4,6-bis-amino-s-triazine derivatives with methyl mercaptan, using methanol as solvent or diluent, the desired correspondingly substituted 2-methylthio-4,6-bis-amino-s-triazines are obtained by carrying out the reaction with methyl mercaptan in methanol in the presence of trimethylamine as acid binding agent.

This finding is unexpected in two ways. Firstly, the use of trimethylamine as acid binding agent clearly promotes the exchange of the halogen atom of the starting material for the $CH_3$—S— radical of the methyl mercaptan whereas, for example, on using alkalies as acid binding agents the undesired methoxy compound is also formed by the reaction of the halogen atom with the methanol. Secondly, the specificity of the trimethylamine is surprising. Actually, if the next higher homologue, trimethylamine, is used as acid binding agent, then there is no exchange of the halogen atom of the starting material whatsoever.

Thee 2-halogeno-4,6-bis-amino-s-triazines used in the process according to the invention as starting materials, are the corresponding fluorine, bromine or chlorine compounds, in particular however, the chlorine compounds.

Examples of organic radicals which may occur as substituents of at least one amino group in the 2-methylthio-4,6-bis-amino-s-triazines produced by the process according to the invention, and in the starting compounds, the 2-halogeno-4,6-bis-amino-s-triazines, are aliphatic hydrocarbon radicals having a carbon chain which is straight chained, branched or interrupted by oxygen or sulfur atoms, furthermore carbocyclic and aralkyl radicals, five- and six-membered heterocyclic radicals, alicyclic radicals which may contain oxygen or sulfur, and also carboxymethyl- and carbalkoxymethyl radicals.

Among the aliphatic hydrocarbon radicals which may be present as substituents of the amino groups, the following may be mentioned: alkyl radicals, e.g. the methyl, ethyl, n-propyl, isopropyl, n-butyl, isobutyl, tert.butyl, sec. butyl, amyl and isoamyl radicals; alkenyl radicals, e.g. the allyl and methallyl radicals. The following alkoxy alkyl and alkenyloxy alkyl radicals are exampes of aliphatic hydrocarbon radicals the chains of which are interrupted by oxygen: the methoxymethyl, 2-methoxyethyl, 3-methoxypropyl, 2-methoxypropyl, ethoxymethyl, 2-ethoxyethyl, 2-ethoxypropyl, 3-ethoxypropyl, n- or iso-propoxymethyl, 2-propoxyethyl, 2-allyloxyethyl, 2-methallyloxyethyl, methoxyethoxyethyl and ethoxyethoxyethyl radical; examples of aliphatic hydrocarbon radicals, the chains of which are interrupted by sulfur, are the following alkylmercapto alkyl and alkenylmercapto alkyl radicals: the methylmercaptomethyl, 2-methylmercaptoethyl, 2-methylmercapto-propyl, 3-methylmercaptopropyl, ethylmercaptomethyl, 2-ethylmercaptoethyl, 2-ethylmercaptopropyl, 3-ethylmercaptopropyl, n- or isopropylmercaptomethyl, 1-propylmercaptoethyl, 2- or 3-propylmercapto-n- propyl, 2- or 3-isopropylmercaptopropyl, 2-allylmercaptoethyl or the methallylmercaptoethyl radical.

Other aliphatic radicals which may be present as substituents of the amino groups are for instance hydroxyalkyl radicals, such as the hydroxymethyl, 2-hydroxyethyl, 3-hydroxypropyl or the 2-, 3- or 4-hydroxybutyl radical; and acyl radicals, especially alkanoyl radicals such as e.g. the formyl, acetyl, propionyl, butyryl and isobutyryl radical as well as alkenoyl radicals, e.g. the crotonyl radical.

The following examples serve to illustrate the process according to the invention. Parts are given as parts by weight and the temperatures are in degrees centigrade.

Example 1

75.5 parts of 2-chloro-4,6-bis-ethylamino-s-triazine are stirred in 200 parts of methanol. A solution of 32.4 parts of trimethylamine in 50 parts of methanol is added and the reaction mixture is stirred for 3 hours at room temperature. A mixture of 20 parts of methylmercaptan in 50 parts of methanol is then slowly added. The whole is stirred for 24 hours at 35–40° whereupon the reaction mixture is filtered and 2,000 parts of water are added to the filtrate. The 2-methylthio-4,6-bis-ethylamino-s-triazine precipitates in crystalline form and is filtered off. It is dried in vacuo at 60°. The yield is 85.1% of the theoretical. M.P. 82–84°. 2-methylthio - 4,6-bis-ethylamino-s-triazine is also obtained in the way described above and with good yields, if 92.2 parts of 2-bromo-4,6-bis-ethylamino-s-triazine are used as the starting material.

Example 2

86 parts of 2-chloro-4,6-bis-isopropylamino-s-triazine are stirred in 200 parts of methanol. A mixture of 32.4 parts of trimethylamine in 50 parts of methanol is added and the reaction mixture is stirred for 3 hours at room temperature. A mixture of 20 parts of methylmercaptan in 50 parts of methanol is then added and the whole is stirred for 24 hours at 35–40°. The reaction mixture is filtered and 2,000 parts of water are added to the filtrate. The 2-methylthio-4,6-bis-isopropylamino-s-triazine which precipitates in crystalline form is filtered off and dried in vacuo at 80°. The yield is 91.7% of the theoretical. M.P. 119–121°.

Example 3

108.4 parts of 2-chloro-4,6-bis-(3'-methoxypropylamino)-s-triazine are stirred in 400 parts of methanol. A solution of 32.4 parts of trimethylamine in 50 parts of methanol is added and the reaction mixture is stirred for 3 hours at room temperature. A mixture of 20 parts of methylmercaptan in 50 parts of methanol is then slowly added and the whole is stirred for 24 hours at 35–40°. The reaction mixture is then filtered, and 3,000 parts of cold water are added to the filtrate. The reaction product is left to form a sediment, the upper solution is decanted off and the solution is again stirred with 2000 parts of cold water. The residue is dissolved in ether, dried with sodium sulphate, filtered and the ether is distilled off at 30–40° in a weak vacuum. The reaction product is cooled to 10° and the hard residue is milled. A yield of 71% of 2 - methylthio-4,6-bis-(3' - methoxypropylamino)-s-triazine is obtained. M.P. 55–59°.

Example 4

97 parts of 2-chloro-4-isopropylamino-6-(3'-methoxypropylamino)-s-triazine are stirred in 200 parts of methanol. A solution of 32.4 parts of trimethylamine in 50 parts of methanol is added and the reaction mixture is stirred for 3 hours at room temperature. A mixture of 20 parts of methylmercaptan in 50 parts of methanol is slowly added to the clear reaction mixture whereupon the whole is stirred for 24 hours at 35–40°. The clear reaction mixture is then stirred in 3,000 parts of cold water. The reaction product is left to form a sediment, the upper solution is decanted off and again stirred with 2,000 parts of cold water. The residue is then dissolved in ether, dried with sodium sulphate, filtered and the ether is distilled off at 30–40° under a weak vacuum. The reaction product is cooled to 10° and the hard residue is milled. A yield of 80% of the theoretical of 2-methylthio-4-isopropylamino-6-(3'-methoxypropylamino) - s - triazine is obtained. M.P. 63–68°.

Example 5

84.4 parts of 2-chloro-4,6-bis-allylamino-s-triazine are stirred in 200 parts of methanol. A solution of 32.4 parts of trimethylamine in 50 parts of methanol is added and the reaction mixture is stirred for 4 hours at room temperature. A mixture of 20 parts of methylmercaptan in 50 parts of methanol is slowly added to the clear reaction solution whereupon the whole is stirred for 20 hours at 35–40° and then for 5 hours at 55–60°. The solution, cooled at 20°, is then filtered and the filtrate is stirred into 3,000 parts of cold water. The solution is taken up in ether, the ether is washed with water and dried with sodium sulfate. After distilling off the ether in a weak vacuum, 84 parts of 2-methylthio-4,6-bis-allylamino-s-triazine are obtained, 94.7% of the theoretical.

After distilling in a high vacuum at 158–162°/0.2 mm. Hg, the still high yield of 72 parts is obtained, 81.7% of the theoretical.

Example 6

90.4 parts of 2-chloro-4-allylamino-6-diethylamino-s-triazine (M.P. 118–120°) are stirred in 200 parts of methanol. A solution of 32.4 parts of trimethylamine in 50 parts of methanol is added and the reaction is stirred for 5 hours at room temperature. A mixture of 20 parts of methylmercaptan in 50 parts of methanol is then slowly added and the whole is stirred for 20 hours at 35–40° and then for 5 hours at 55–60°. The reaction mixture is then cooled to 15°, filtered and the filtrate is washed with a little cold methanol.

The crystalline 2 - methylthio-4-allylamino-6-diethylamino-s-triazine is dried at 80° in vacuo. The yield is 82 parts, 87.2% of the theoretical. M.P. 129–130°.

Example 7

80.7 parts of 2-chloro-4-ethylamino-6-isopropylamino-s-triazine are stirred in 200 parts of methanol. A solution of 32.4 parts of trimethylamine in 50 parts of methanol is added and the reaction mixture is stirred for 3 hours at room temperature. A mixture of 20 parts of methylmercaptan in 50 parts of methanol is slowly added to the clear reaction solution, and the whole is stirred for 24 hours at 35–40°. The clear reaction solution is stirred in 3,000 parts of water which is then allowed to cool while stirring.

The 2 - methylthio-4-ethylamino-6-isopropylamino-s-triazine precipitates in crystalline form and is filtered off. It is dried in vacuo at 50°. The yield is 93% of the theoretical. M.P. 86–88°.

Example 8

85.2 parts of 2-chloro-4-allylamino-6-isopropylamino-s-triazine are stirred in 200 parts of methanol. A solution of 32.4 parts of trimethylamine in 50 parts of methanol is added and the reaction mixture is stirred for 3 hours at room temperature. A mixture of 20 parts of methylmercaptan in 50 parts of methanol is slowly added to the reaction solution and then the whole is stirred for 24 hours at 35–40°. The clear reaction mixture is then stirred in 3,000 parts of cold water. The reaction product is left to form a sediment, the upper solution is decanted off and again stirred with 2,000 parts of cold water. It is ethered out, the ether solution is dried, filtered and the ether is distilled off at 36–40° in a weak vacuum. A yield of 91.1% of crude 2-methylthio-4-allylamino-6-isopropylamino-s-triazine is obtained. After distillation in a high vacuum at 148–150°/0.3 mm. Hg, the yield is still 67% of the theoretical.

We claim:

In a process for the production of 2-methylthio-4,6-bis-amino-s-triazines by reacting a 2-halogeno-4,6-bis-amino-s-triazine with methyl mercaptan in a reaction medium containing an acid binding agent, the improvement wherein the reaction medium is methanol and the acid binding agent is trimethylamine.

References Cited by the Examiner

UNITED STATES PATENTS 2,909,420  10/59  Gysin et al.

FOREIGN PATENTS 1,239,784  7/60  France.

OTHER REFERENCES

Dudley et al.: J.A.C.S. 73, 2986–90 (1951).

WALTER A. MODANCE, *Primary Examiner.*
NICHOLAS S. RIZZO, *Examiner.*